United States Patent [19]

Caron

[11] Patent Number: 5,336,995
[45] Date of Patent: Aug. 9, 1994

[54] ANNULAR SPEED SENSOR WITH STRAIN RELIEF

[75] Inventor: LaVerne A. Caron, Kalamazoo, Mich.

[73] Assignee: Eaton Corporati, Cleveland, Ohio

[21] Appl. No.: 980,038

[22] Filed: Nov. 23, 1992

Related U.S. Application Data

[63] Continuation-in-part of Ser. No. 622,108, Dec. 3, 1990, Pat. No. 5,227,719, which is a continuation-in-part of Ser. No. 578,383, Sep. 7, 1990, abandoned.

[51] Int. Cl.$^5$ ............ G01P 3/48; G01P 3/54; F16D 1/00
[52] U.S. Cl. ............ 324/174; 324/207.15; 324/207.25; 403/408.1
[58] Field of Search .......... 324/173, 174, 207.12, 324/207.13, 207.15, 207.25, 225, 262; 310/68 B; 384/448; 403/365–368, 372–374, 405.1, 408.1

[56] References Cited

U.S. PATENT DOCUMENTS

| | | | |
|---|---|---|---|
| 3,556,610 | 1/1971 | Leiber | 303/21 |
| 3,604,760 | 9/1971 | Atkins | 303/21 |
| 3,870,911 | 3/1975 | Toyama et al. | 210/155 |
| 4,027,753 | 6/1977 | Lantz | 188/181 |
| 4,585,280 | 4/1986 | Leiber | 303/100 |
| 4,689,557 | 8/1987 | Smith et al. | 324/174 |
| 4,768,840 | 9/1988 | Sullivan et al. | 303/6.01 |
| 4,862,025 | 8/1989 | Dierker, Jr. et al. | 310/68 |
| 4,863,221 | 9/1989 | McNinch, Jr. | 303/94 |
| 4,901,562 | 2/1990 | Beakas et al. | 73/118.1 |

FOREIGN PATENT DOCUMENTS

| | | |
|---|---|---|
| 0357870 | 3/1990 | European Pat. Off. . |
| 1911487 | 2/1970 | Fed. Rep. of Germany . |
| 1576303 | 7/1969 | France . |

*Primary Examiner*—Walter E. Snow
*Attorney, Agent, or Firm*—Roger A. Johnston

[57] ABSTRACT

An in-axle shaft speed sensor has an annular configuration and is attached to the axle differential bearing adjustment ring. An annular sensor housing ring has a radially inwardly extending flange with inwardly cantilevered tabs formed therein for absorbing by localized axial deflection the clamping loads of attachment screws. The stator ring is configured for an axial air flux gap with the rotor poles and is axially adjacent the housing ring and has cut-outs therein to permit free deflection of the tabs and prevents axial distortion of the stator ring and mis-alignment of the poles.

2 Claims, 3 Drawing Sheets

ANNULAR SPEED SENSOR WITH STRAIN RELIEF

CROSS-REFERENCE TO RELATED APPLICATION

This application is a continuation-in-part of U.S. application Ser. No. 622,108, filed Dec. 3, 1990 in the names of Glen D. Petersen and LaVerne A. Caron, now U.S. Pat. No. 5,227,719 and assigned to the assignee of the present invention which is a continuation-in-part of U.S. application Ser. No. 578,383, filed Sep. 7, 1990, now abandoned and assigned to the assignee of the present invention.

BACKGROUND OF THE INVENTION

The present invention relates to an in-axle rotational speed sensor assembly for mounting to a fixed or stationary ferromagnetic member such as a drive axle differential bearing adjustor having a central opening therethrough for receipt of a rotatable member such as a shaft for measurement of the rotational speed thereof. Wheel speed sensors have become increasingly important for providing an electric signal indicative of wheel speed for use with anti-lock brake systems (ABS), traction control, and differential lock-up systems in brake control systems, and the like. Typically, the sensor provides a wheel speed signal to a micro-processor-based control unit (ECU) as is well known in the art. Examples of such systems and/or sensors may be seen by reference to U.S. Pat. Nos. Re. 30,522; 3,961,215; 3,929,382; 3,556,610; 3,604,760; 4,585,280; 4,361,060; 3,768,840; 4,818,035; and 4,863,221, disclosures of which are incorporated herein by reference.

Typically, such rotational speed sensor assemblies are electromagnetic in nature, and rely on alignment of rotor teeth or spaces between rotor teeth rotating past the sensor to complete or break, respectively, the magnetic flux path to produce a digital or analogue signal indicative of the rotational speed of the motor.

Placement of wheel speed sensor assemblies within the axle (i.e., "in-axle") to protect same is also known, as may be seen by reference to U.S. Pat. Nos. 3,769,533; 4,724,935; 4,836,616; 4,862,025; and 4,862,028; disclosures of which are incorporated herein by reference.

Annular rotational speed sensor assemblies having an annular toothed stator/sensor surrounding a rotating toothed rotor, or vice-versa, are well known in the art. Annular speed sensor assemblies are preferred over single or multiple point type sensor assemblies in certain situations, as they provide a relatively high signal-to-noise ratio, tend to be self-compensating for run-out errors between the rotor and stator, and require little or no adjustment. Examples of such in-axle annular speed sensor assemblies may be seen by reference to U.S. Pat. Nos. 4,870,911; 4,027,753; and 4,689,557, the disclosures of which are incorporated herein by reference.

The annular speed sensor described in the above-referenced parent applications have provided for a low-cost sensor especially for use with drive axles at an inboard location where the sensor could easily be protected. However, some problems have been encountered in assembly in which certain parts of the sensor were deformed during mounting, and affected the signal output of the sensor; and, thus it has been desired to provide such an in-axle wheel sensor which can be easily and reliably assembled into the drive axle without requiring special tools or measurements during the assembly, and which is not distorted during assembly so as to affect the signal output.

SUMMARY OF THE INVENTION

The present invention provides a solution to the above-described assembly problems for an in-axle wheel speed sensor; and, it has an annular configuration and is mounted in the axle assembly in a relatively protected position at the center of the drive axle at either or both sides of the differential bearing adjustment members which provides a pilot portion for the axle shafts which are inserted through an opening in the bearing adjustor for driving engagement with the differential side gearing and which requires no adjustment. The sensor mounts to the drive axle differential bearing assembly adjustment member, which includes pilot means to assist assembly of the axle shafts to the drive axle differential side gearing and requires no adjustment. The sensor assembly is held together by a plurality of circumferentially spaced screws which threadedly engage the bearing adjustor through tabs cut out in the housing rings to retain the stator thereon. The stator ring has cut-outs or voids provided therein to permit deflection of the mounting tabs under loading of the assembly screws, and thus prevents localized distortion of the stator ring during assembly.

DETAILED DESCRIPTION

Figure 1:
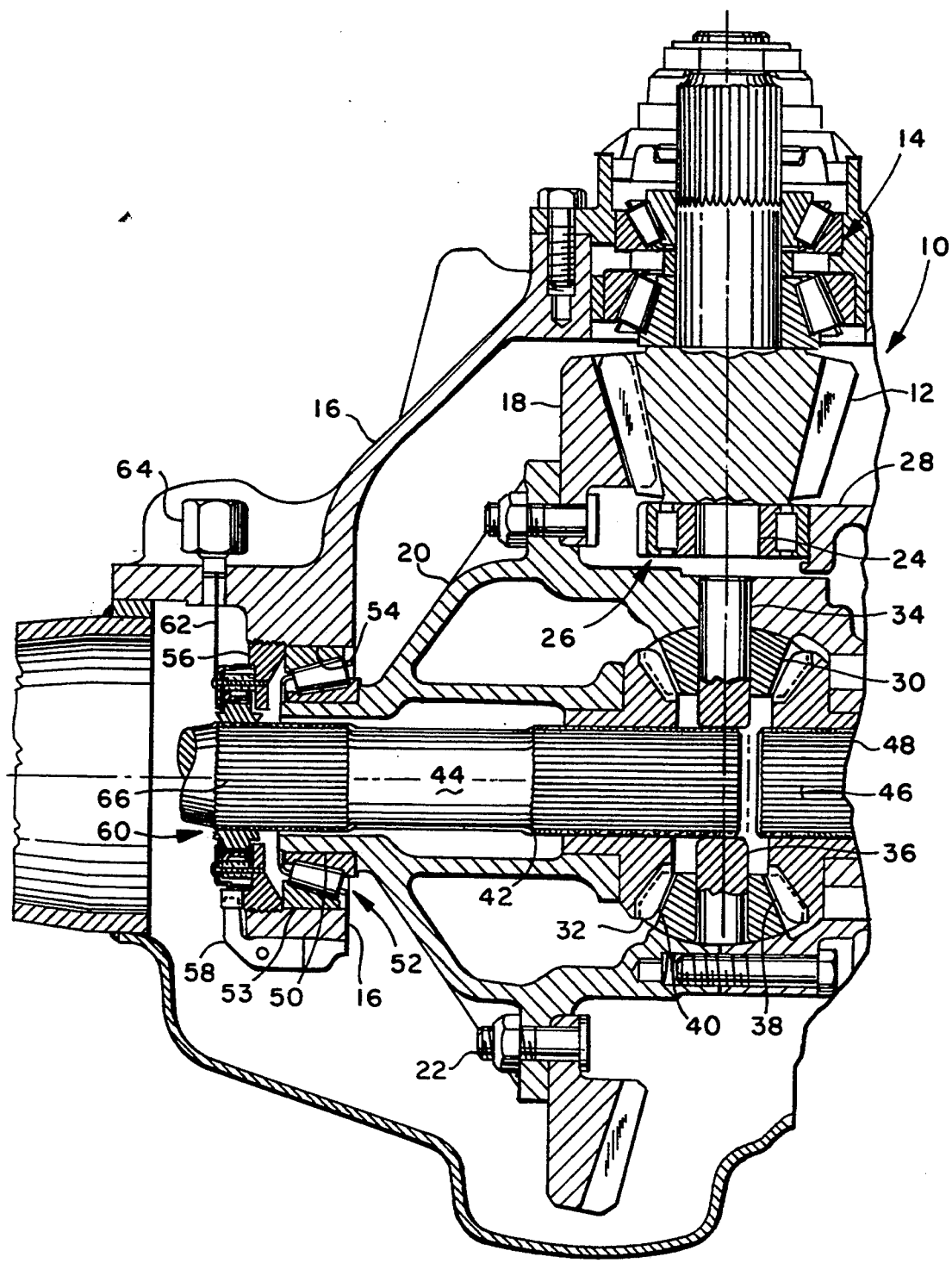
FIG. 1 is a cross-section of a portion of a vehicle drive axle differential assembly.

Referring to FIG. 1, a drive axle assembly is indicated generally at 10, and has a drive pinion 12 journalled by a dual bearing assembly indicated generally at 14 in an axle housing or carrier 16. Pinion 12 drivingly engages a ring gear 18, which is bolted to differential case 20 by means of a plurality of circumferentially spaced bolts 22. Pinion 12 also has a pilot stub shaft 24 formed thereon on the end thereof remote from the bearings 14; and, stub shaft 24 is journalled in a pinion pilot bearing indicated generally at 26, which has the outer race thereof mounted on a supporting portion 28 of the housing 16.

Case 20 has provided thereon oppositely disposed pairs of spider gears, one pair of which is shown and denoted by reference numerals 30,32 which are freely rotatable on trunnions 34,36, and which engage on opposite sides thereof, axle end gears 38,40. End gear 40 is internally splined and drivingly connected to spline 42 of axle half shaft 44 extending leftwardly in FIG. 1; and, axle side gear 38 is internally splined and drivingly engaged to axle spline 46 of right hand half axle 48.

Case 20 has a hub portion 50 extending axially outwardly therefrom and hub 50 is journalled on the inner race of a carrier bearing assembly indicated generally at 52 which has its outer race 53 thereof registered in a bore 54 provided in the axle housing 16. A bearing adjustment ring 56 is threadedly engaged in threads provided in the left hand end of bore 54 in the housing; and, ring 56 is rotated to contact the outboard axial face of the outer race 53 of carrier bearing assembly 52 for adjusting the position of the bearing.

A locking lever 58 is pivoted on housing 16 for engaging recesses on the adjustment ring 56 as will hereinafter be described for securing the rotationally adjusted position of the ring 56.

A wheel speed sensor indicated generally at 60, will be described hereinafter in greater detail is disposed on ring 56. Sensor 60 has electrical leads indicated by reference numeral 62, which pass outwardly through carrier 16 and a suitable fitting 64 in a manner known in the art.

Figure 2:
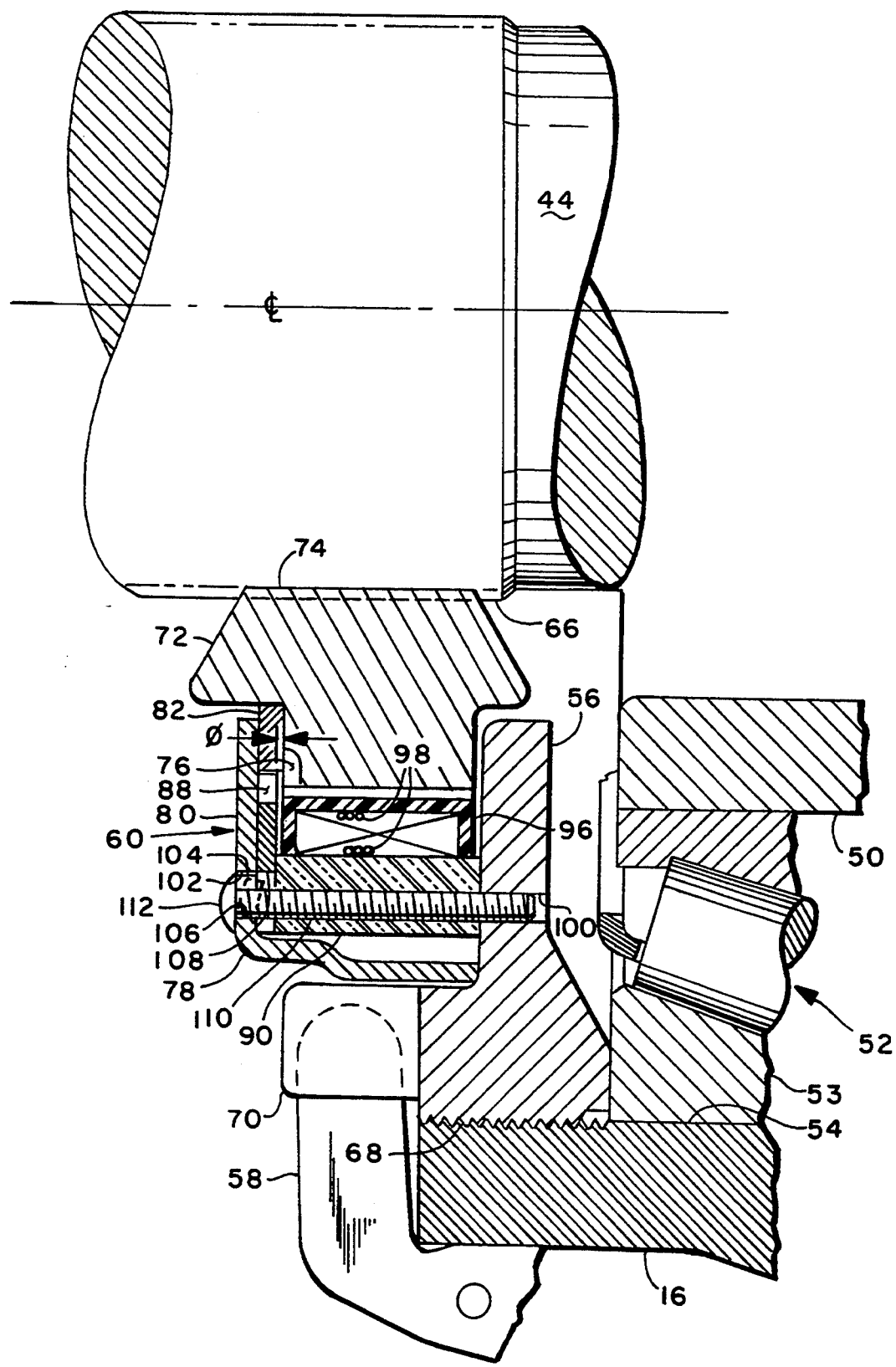
FIG. 2 is an enlarged view of a portion of FIG. 1.

Referring to FIGS. 1 and 2, axle half shaft 44 has a second spline 66 provided thereon and disposed at a location outboard of the axle side gear spline 42. Alternatively spline 42 may, if desired, be continued in the axial outboard direction to the region of spline 66.

Figure 3:
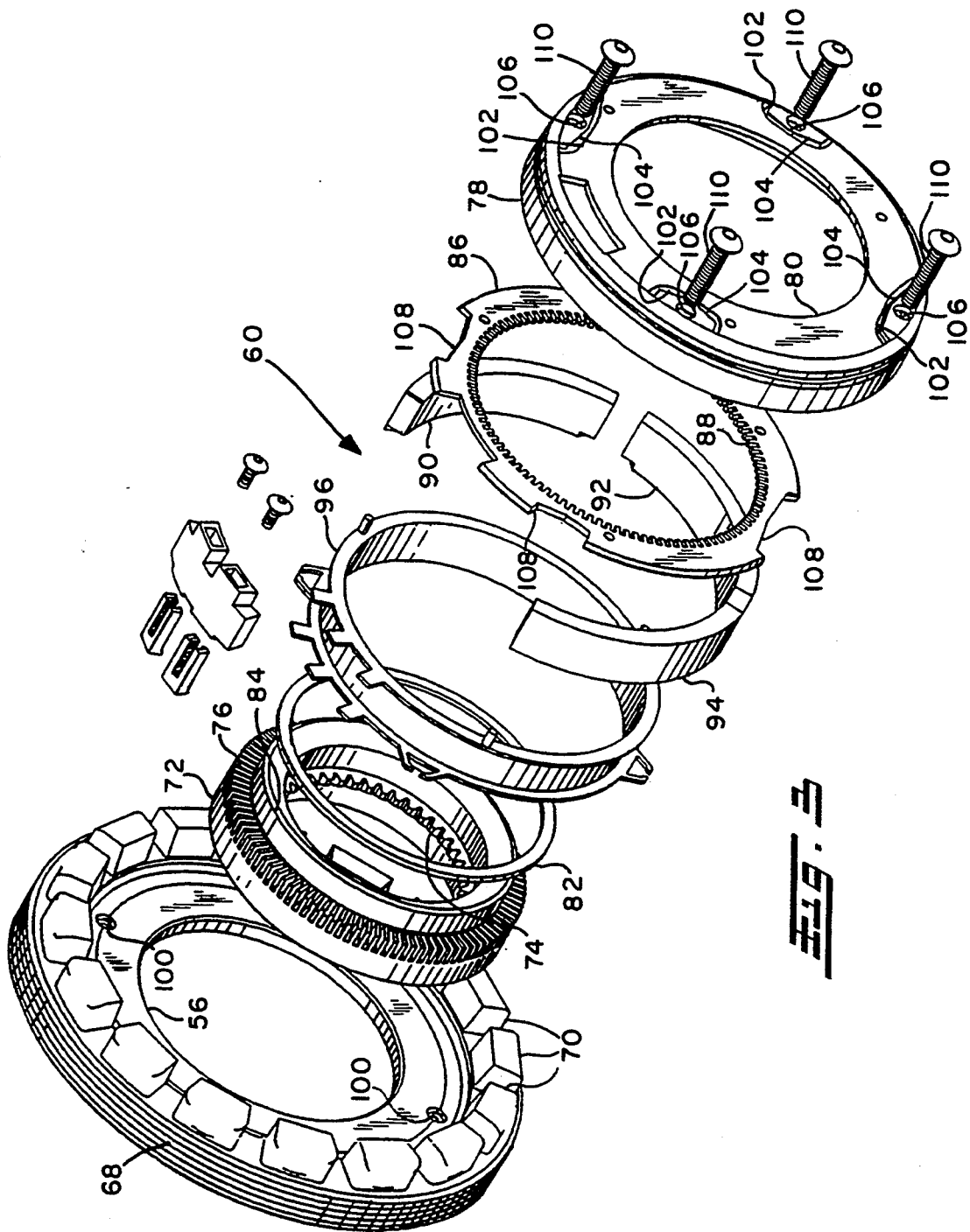
FIG. 3 is an exploded view of the axle speed sensor employed in the embodiment of FIG. 1.

Referring to FIGS. 2 and 3, the adjustment ring 56 has the outer diameter thereof provided with threads 68 and has circumferentially spaced lugs 70 disposed about the axial face thereof for engagement by locking lever 58. The wheel speed sensor 60 includes a rotor 72 which has the inner periphery thereof provided with a plurality of splines 74, which engage the spline 66 on axle half shaft 44 such that rotor 72 rotates with the axle 44. Rotor 72 also has a plurality of circumferentially spaced rotor poles or teeth 76 provided on the axial face thereof and disposed about the circumference. In the present practice one hundred of the poles 76 are utilized.

Wheel speed sensor 60 has an annular housing 78 which has a radially inwardly-extending flange 80, which has the axial face thereof adjacent the inner periphery bearing against a thrust washer 82, which contacts the surface 84 of rotor 72.

An annular generally disc-shaped stator ring 86 is disposed against the inner face of housing flange 80; and, the stator has a plurality of radially inwardly extending poles or teeth 88 provided about the inner periphery thereof, which plurality corresponds in number to the number of rotor poles 74. It will be understood from the relationship of the assembly of parts as shown in FIG. 2 that the pole segments 88 of the rotor are disposed to form an axial air gap with the rotor poles 76 for continuation of a magnetic flux path. The axial air gap is denoted by the reference character $\phi$ in FIG. 2.

A plurality and preferably three arcuately shaped magnet segments denoted by reference numerals 90,92,94 are disposed in circumferentially spaced arrangement about the inner periphery of the housing 78 and axially abutting the face of the stator 86. A plastic coil bobbin 96 is disposed radially inwardly of the magnets 90,92,94; and, the bobbin is wound with a plurality of turns of the electrical conductor 98 which form a coil as illustrated in FIG. 2, but which has been omitted for clarity in FIG. 3.

The bearing adjustment ring 56 has a plurality of axially threaded bores 100 spaced circumferentially thereabout, one of which is illustrated in FIG. 2 and two of which are visible in FIG. 3. In the presently preferred practice, four such threaded bores 100 are provided about adjustment ring 56 for attachment thereto.

Referring to FIG. 3, the sensor housing 78 has formed in the flange 80 thereof a plurality of circumferentially spaced cut-outs 102, which are spaced to coincided circumferentially with the threaded holes 100 in the adjustment ring 56. The slots 102 are shaped so as to define in each of the slots 102 a corresponding tab 104 cantilevered outwardly from the rim of the housing; and, each of the tabs 104, respectively, has an aperture 106 formed therein.

The stator ring 86 has a plurality of tab clearance notches or cut-outs 108 provided in the outer periphery thereof and spaced circumferentially to coincide with the slots 102 in the housing; and, three of the four cut-outs 108 are visible in FIG. 3.

Referring to FIGS. 2 and 3, each of the apertures 106 in the housing has received therethrough a screw 110 which passes through the corresponding adjacent cut-out 108 in stator ring 86 and is threadedly engaged in the bore 100 in the adjustor ring 56. The axial edge of the housing 78 is thus retained against the axial face of the adjustor ring 56 and thus maintaining the assembly of the speed sensor 60 onto the adjustment ring 56.

Referring to FIG. 2, the deflected position of the tabs 104 into the region of the cut-outs 108 is shown in dashed outline as it may occur during installation when the head 112 of the screw bears against the axial face of tabs 104 as when the screws are torqued at assembly. This cantilever deflection of the tabs 104 as shown in dashed outline in FIG. 2 thus absorbs the localized clamping force of the heads 112 of the screws, and thus provides strain relief of the clamping forces of the screw head and prevents distortion of the stator ring and any consequent disturbance of the flux path.

The present invention thus provides an improved in-axle shaft or wheel speed sensor which may be readily assembled onto the bearing adjustor for the differential carrier bearing in a drive axle. The shaft speed sensor of the present invention provides for ease of assembly and strain relief which occurs during tightening of the mounting screws and eliminates distortion of the magnetic poles of the sensor stator ring.

Although the invention has hereinabove been described with respect to the illustrated embodiments, it will be understood that the invention is capable of modification and variation, and is intended as limited only by the scope of the following claims.

I claim:

1. An annular rotational speed sensor assembly for sensing the rotational speed of a shaft passing through a bore in a fixed ferromagnetic member, said assembly comprising a ferromagnetic rotor mountable to said shaft for rotation therewith, a first annular array of teeth extending from said rotor, an annular ferromagnetic stator mountable to said ferromagnetic member and defining a second annular array of teeth to define an air gap therebetween, a substantially annular magnet and a coil with an annular retainer member having a plurality of fasteners received therethrough for retaining said stator on said fixed member; the improvement characterized in that said retaining member has portions thereof relieved about each of said fasteners to permit localized deflection of said retaining member in the region of each of said fasteners; and, said stator has voids formed therein to accommodate said localized deflection.

2. The assembly defined in claim 1, wherein said fasteners comprise screws with each screw received through an aperture provided in a tab formed by said relieved portions; and, said screws threadedly engage said fixed member.

* * * * *